United States Patent
Qu et al.

(10) Patent No.: US 11,444,528 B2
(45) Date of Patent: Sep. 13, 2022

(54) MOTOR CONTROLLER ELECTRICAL-DISCHARGE CONTROL CIRCUIT

(71) Applicant: JING-JIN ELECTRIC TECHNOLOGIES CO., LTD, Beijing (CN)

(72) Inventors: Yuxia Qu, Beijing (CN); Hao Zhang, Beijing (CN); Ying Wang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/042,902

(22) PCT Filed: Mar. 13, 2019

(86) PCT No.: PCT/CN2019/077978
§ 371 (c)(1),
(2) Date: Sep. 28, 2020

(87) PCT Pub. No.: WO2019/192295
PCT Pub. Date: Oct. 10, 2019

(65) Prior Publication Data
US 2021/0057985 A1 Feb. 25, 2021

(30) Foreign Application Priority Data
Apr. 2, 2018 (CN) .......................... 201810283013.2

(51) Int. Cl.
*H02M 1/32* (2007.01)
(52) U.S. Cl.
CPC .............. *H02M 1/32* (2013.01); *H02M 1/322* (2021.05)

(58) Field of Classification Search
CPC ........... H02M 1/32; H02M 1/322; H02M 1/08
(Continued)

(56) References Cited

U.S. PATENT DOCUMENTS

2011/0062919 A1    3/2011  Hung et al.

FOREIGN PATENT DOCUMENTS

| CN | 102025272 A | 4/2011 |
|---|---|---|
| CN | 203056953 U | 7/2013 |

(Continued)

OTHER PUBLICATIONS

Avago Technologies ACPL-K30T Automotive Photovoltaic MOSFET Driver with R2CouplerTM Isolation Oct. 9, 2014 (Year: 2014).*
(Continued)

*Primary Examiner* — Kevin J Comber
(74) *Attorney, Agent, or Firm* — Moser Taboada

(57) ABSTRACT

The present disclosure discloses a discharge controlling circuit of an electric-motor controller, wherein the discharge controlling circuit includes a discharging-signal transmitting circuit, a switch circuit and a discharging circuit; the switch circuit is connected respectively to the discharging-signal transmitting circuit and the discharging circuit; the discharging circuit is connected to an anode of a busbar; an input end of the discharging-signal transmitting circuit is connected to a discharging-signal outputting pin of the electric-motor controller, and an output end of the discharging-signal transmitting circuit is connected to a cathode of the busbar; the discharging-signal transmitting circuit is configured to output a controlling signal to the switch circuit according to a received discharging signal; and the switch circuit is connected to the anode of the busbar, the cathode of the busbar and the output end of the discharging-signal transmitting circuit, and is configured to be turned on according to the received controlling signal and discharge via the
(Continued)

discharging circuit. The discharge controlling circuit of an electric-motor controller of the present embodiment can realize active quick discharging, which prevents the risk of high-voltage leakage, and guarantees the safety of the electric-motor controller.

3 Claims, 2 Drawing Sheets

(58) Field of Classification Search
USPC .......................................................... 361/18
See application file for complete search history.

(56) References Cited

FOREIGN PATENT DOCUMENTS

| | | | |
|---|---|---|---|
| CN | 104993676 | A | 10/2015 |
| CN | 105406700 | A | 3/2016 |
| CN | 106787657 | A | 5/2017 |
| CN | 108429444 | A | 8/2018 |
| DE | 102012100951 | A1 | 8/2013 |
| JP | 2001060835 | A * | 3/2001 |
| JP | 3295898 | B2 | 6/2002 |

OTHER PUBLICATIONS

International Search Report on Application No. PCT/CN2019/077978 dated Jun. 11, 2019.
Office Action for Japanese Patent Application No. 2020552006 with English Translation dated Nov. 19, 2021.

* cited by examiner

MOTOR CONTROLLER ELECTRICAL-DISCHARGE CONTROL CIRCUIT

TECHNICAL FIELD

The present disclosure relates to the technical field of electric-motor controllers of electric vehicles, and particularly relates to a discharge controlling circuit of an electric-motor controller.

BACKGROUND

Electric-motor controllers are mainly used to convert the high-voltage direct current of a power battery of an electric vehicle by using a three-phase inverter circuit into three-phase alternating current, to provide power supply to an electric motor, to in turn provide power for the operation of the vehicle. In current electric-motor controllers, capacitor elements have already been indispensable, so the operation process of the capacitors influences the overall performance of the circuit. Especially, when relatively larger capacitors are used, if merely passive discharging is employed, under the limitations on the internal spaces of the controllers and the powers of the discharging resistors, the discharging duration is long, and a risk of high-voltage leakage exists.

SUMMARY

The present disclosure provides a discharge controlling circuit of an electric-motor controller, to solve the technical problems of electric-motor controllers of a long discharging duration and a risk of high-voltage leakage.

According to an aspect of the present disclosure, there is provided a discharge controlling circuit of an electric-motor controller, wherein the discharge controlling circuit comprises: a discharging-signal transmitting circuit, a switch circuit and a discharging circuit;

the switch circuit is connected respectively to the discharging-signal transmitting circuit and the discharging circuit;

the discharging circuit is connected to an anode of a busbar;

an input end of the discharging-signal transmitting circuit is connected to a discharging-signal outputting pin of the electric-motor controller, and an output end of the discharging-signal transmitting circuit is connected to a cathode of the busbar;

the discharging-signal transmitting circuit is configured to output a controlling signal to the switch circuit according to a received discharging signal; and the switch circuit is connected to the anode of the busbar, the cathode of the busbar and the output end of the discharging-signal transmitting circuit, and is configured to be turned on according to the received controlling signal and discharge via the discharging circuit.

Optionally, the discharging-signal transmitting circuit comprises: an optical coupler and a filter circuit;

the filter circuit comprises a first filter capacitor, a second filter resistor and a second filter capacitor;

an input anode pin of the optical coupler is connected to the discharging-signal outputting pin, and the discharging-signal outputting pin is connected to the electric-motor controller;

an input cathode pin of the optical coupler is grounded;

a signal outputting cathode of the optical coupler is connected to one end of the first filter capacitor and connected to the cathode of the busbar;

a signal outputting anode of the optical coupler is connected to the other end of the first filter capacitor and one end of the second filter resistor, and the other end of the second filter resistor is connected to one end of the second filter capacitor and a controlling end of the switch circuit; and the other end of the second filter capacitor is connected to the cathode of the busbar.

Optionally, the switch circuit comprises: a triode, an MOS transistor, and a seventh divider resistor, an eighth divider resistor, a ninth divider resistor, a tenth divider resistor, an eleventh divider resistor, a twelfth divider resistor, a thirteenth divider resistor, a fourteenth divider resistor, a fifteenth divider resistor, a sixteenth divider resistor and a seventeenth divider resistor that are sequentially connected in series;

a base of the triode is connected to the signal outputting anode of the optical coupler;

an emitter of the triode is connected to one end of the sixteenth divider resistor, one end of the seventeenth divider resistor and a grid of the MOS transistor;

a collector of the triode is firstly connected to the other end of the seventeenth divider resistor and then connected to the cathode of the busbar; and a source of the MOS transistor is connected to the cathode of the busbar, and a drain of the MOS transistor is connected to the discharging circuit.

Optionally, the switch circuit further comprises: a third capacitor and a diode;

one end of the third capacitor is connected to one end of the seventeenth divider resistor and the emitter of the triode;

the other end of the third capacitor is connected to the other end of the seventeenth divider resistor and the collector of the triode;

a cathode of the diode is connected to one end of the seventeenth divider resistor and the grid of the MOS transistor; and an anode of the diode is firstly connected to the other end of the seventeenth divider resistor and the source of the MOS transistor and then connected to the cathode of the busbar.

Optionally, the discharging circuit comprises: a third discharging resistor, a fourth discharging resistor, a fifth discharging resistor and a sixth discharging resistor that are connected in parallel;

one end of the fifth discharging resistor is connected to the drain of the MOS transistor; and the other end of the fifth discharging resistor is connected to the anode of the busbar.

Optionally, resistance value of each of the third discharging resistor, the fourth discharging resistor, the fifth discharging resistor and the sixth discharging resistor is 110Ω.

Optionally, a model of the optical coupler is: ACPL-K30T-000E.

The advantageous effects of the present disclosure are as follows. The discharge controlling circuit of an electric-motor controller of the embodiments of the present disclosure comprises the discharging-signal transmitting circuit, the switch circuit and the discharging circuit, wherein the discharging-signal transmitting circuit is configured to output a controlling signal to the switch circuit according to a received discharging signal, and the switch circuit is configured to be turned on according to the received controlling signal and discharge via the discharging circuit. The present disclosure prevents the risk of high-voltage leakage, and obtains the advantageous effect that once emergency happens, the capacitors can be discharged within a short duration. Furthermore, the circuit has a simple structure and a low cost, and can be conveniently promoted and applied on a large scale.

DETAILED DESCRIPTION

The design concept of the present disclosure is as follows. Aiming at the problems of the passively discharging circuits of electric-motor controllers in the prior art of a long discharging duration and a risk of high-voltage leakage, the embodiments of the present disclosure provide an active discharge controlling circuit, which, by receiving by the discharging-signal transmitting circuit the discharging signal outputted by the electric-motor controller, controlling the switch circuit to turn on and discharging via the discharging circuit, can prevent the risk of high-voltage leakage. Once emergency happens, the capacitors can be discharged within a short duration. The circuit has a simple structure and a high degree of intellectualization, and guarantees the safety of the electric-motor controller.

The discharge controlling circuit of an electric-motor controller of the present embodiment comprises: a discharging-signal transmitting circuit, a switch circuit and a discharging circuit;

the switch circuit is connected respectively to the discharging-signal transmitting circuit and the discharging circuit;

the discharging circuit is connected to the anode of a busbar;

the input end of the discharging-signal transmitting circuit is connected to a discharging-signal outputting pin of the electric-motor controller, and the output end of the discharging-signal transmitting circuit is connected to the cathode of the busbar;

the discharging-signal transmitting circuit is configured to output a controlling signal to the switch circuit according to a received discharging signal; and the switch circuit is connected to the anode of the busbar, the cathode of the busbar and the output end of the discharging-signal transmitting circuit, and is configured to be turned on according to the received controlling signal and discharge via the discharging circuit.

Figure 1:
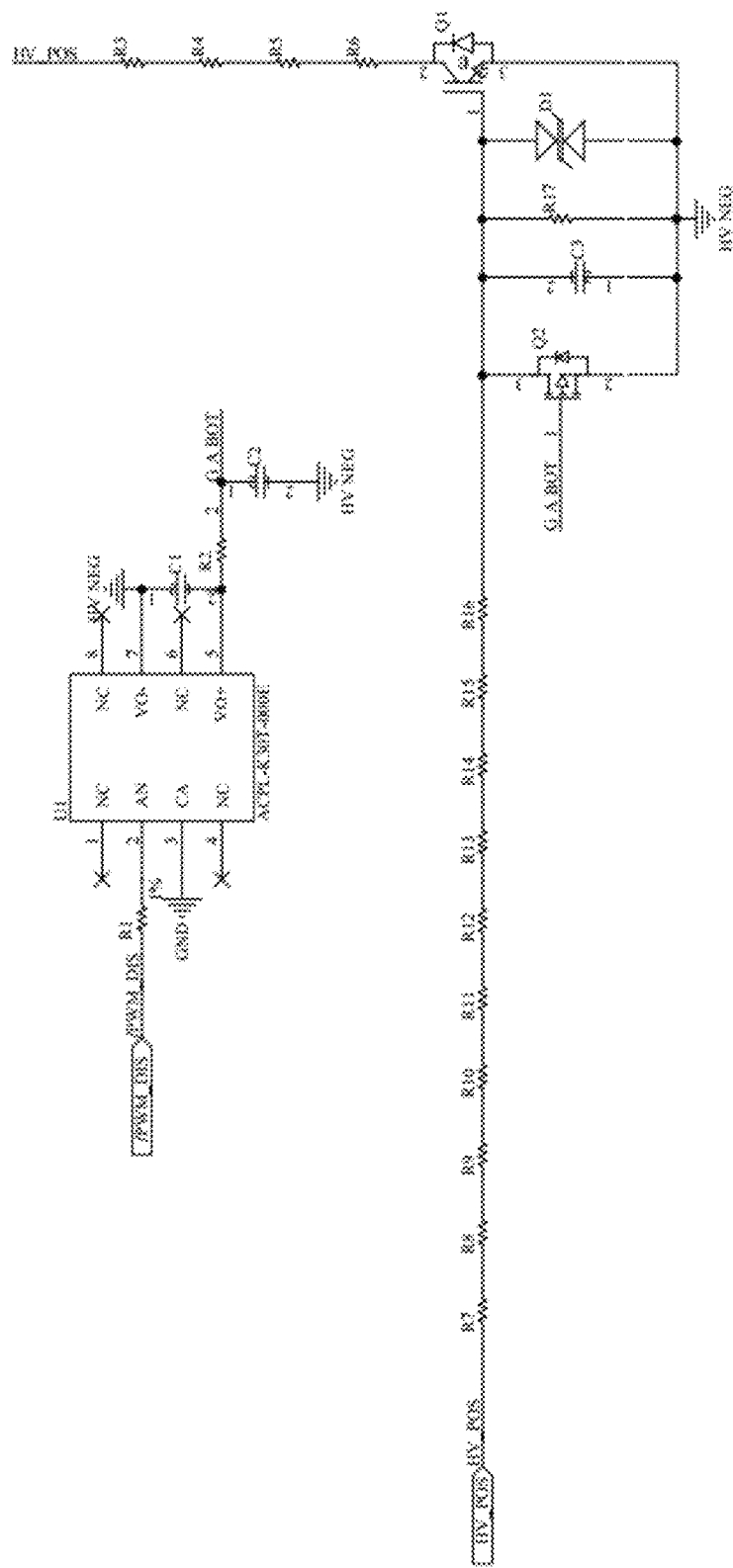
FIG. 1 is a schematic diagram of the discharge controlling circuit of an electric-motor controller according to an embodiment of the present disclosure.

FIG. 1 is a schematic diagram of the discharge controlling circuit of an electric-motor controller according to an embodiment of the present disclosure. The discharge controlling circuit of an electric-motor controller of the present embodiment will be described by referring to FIG. 1.

Referring to FIG. 1, the discharging-signal transmitting circuit comprises: an optical coupler U1 and a filter circuit;

the filter circuit comprises a first filter capacitor C1, a second filter resistor R2 and a second filter capacitor C2;

an input anode pin (i.e., the AN pin) of the optical coupler U1 is connected to a discharging-signal outputting pin PWM_DIS, and the discharging-signal outputting pin PWM_DIS is connected to the electric-motor controller (not shown in FIG. 1);

an input cathode pin (the CA pin) of the optical coupler U1 is grounded;

a signal outputting cathode (VO−) of the optical coupler U1 is connected to one end of the first filter capacitor C1 and is connected to the cathode HV_NEG of a busbar; and a signal outputting anode VO+ of the optical coupler U1 is connected to the other end of the first filter capacitor C1 and is connected to one end of the second filter resistor R2, and the other end of the second filter resistor R2 is connected to one end of the second filter capacitor C2 and a controlling end (the base of a triode Q2 in the present embodiment) of the switch circuit, which can be seen in the connection in FIG. 1 between the signal line of the secondary output pin G A BOT of the optical coupler and the base of the triode.

The other end of the second filter capacitor C2 is connected to the cathode HV_NEG of the busbar.

Referring to FIG. 1, the four normally closed pins (NC) of the optical coupler U1 are not connected to any point in the circuit. The main function of the optical coupler is to isolate the high voltage from the low voltage to protect the circuit. In the present embodiment, the model of the optical coupler is: ACPL-K30T-000E.

The optical coupler does not require an extra power supply, and thus saves the cost and simplifies the circuit.

Referring to FIG. 1, the switch circuit comprises: the triode Q2, an MOS transistor Q1, and a seventh divider resistor R7, an eighth divider resistor R8, a ninth divider resistor R9, a tenth divider resistor R10, an eleventh divider resistor R11, a twelfth divider resistor R12, a thirteenth divider resistor R13, a fourteenth divider resistor R14, a fifteenth divider resistor R15, a sixteenth divider resistor R16 and a seventeenth divider resistor R17 that are sequentially connected in series;

the base (i.e., the pin 1) of the triode Q2 is connected to the signal outputting anode VO+ of the optical coupler U1;

the emitter (i.e., the pin 3) of the triode Q2 is connected to one end of the sixteenth divider resistor R16, one end of the seventeenth divider resistor R17 and the grid (i.e., the pin 1) of the MOS transistor Q1;

the collector (i.e., the pin 2) of the triode Q2 is firstly connected to the other end of the seventeenth divider resistor R17 and then connected to the cathode HV_NEG of the busbar; and the source (i.e., the pin 3) of the MOS transistor Q1 is connected to the cathode HV_NEG of the busbar, and the drain (i.e., the pin 2) of the MOS transistor Q1 is connected to the discharging circuit.

In order to protect the MOS switch transistor to normally operate, the switch circuit of the present embodiment further comprises: a third capacitor C3 and a diode D1;

one end of the third capacitor C3 is connected to one end of the seventeenth divider resistor R17 and the emitter of the triode Q2;

the other end of the third capacitor C3 is connected to the other end of the seventeenth divider resistor R17 and the collector of the triode Q2;

the cathode of the diode D1 is connected to one end of the seventeenth divider resistor R17 and the grid of the MOS transistor Q1; and the anode of the diode D1 is firstly connected to the other end of the seventeenth divider resistor R17 and the source of the MOS transistor Q1 and then connected to the cathode HV_NEG of the busbar.

The busbar as used herein refers to the high-voltage busbar of the battery that supplies power to the electric-motor controller.

Referring to FIG. 1, the discharging circuit comprises: a third discharging resistor R3, a fourth discharging resistor R4, a fifth discharging resistor R5 and a sixth discharging resistor R6 that are connected in parallel;

one end of the fifth discharging resistor R5 is connected to the drain of the MOS transistor Q1; and the other end of the fifth discharging resistor R5 is connected to the anode HV_POS of the busbar.

In the present embodiment, the resistance value of each of the third discharging resistor R3, the fourth discharging resistor R4, the fifth discharging resistor R5 and the sixth discharging resistor R6 is 110Ω.

It should be noted that, the settings of the quantity and the resistance values of the discharging resistors are the key to the discharging circuit. The process of setting the quantity and the resistance values of the discharging resistors of the present embodiment will be emphatically described below.

Because of the limitation on the volume of the controller, the installing mode and so on, the present embodiment employs the LTO100 vehicle-certification-grade series discharging resistors, whose withstand voltage is 500V, and rated power is 100 W @25 T C. By taking into consideration the withstand voltage and the heat-dissipation safety, the discharge controlling circuit uses at least two LTO100 resistors connected in series.

When it is to be realized that the electric-motor controller is discharged from 500V to 60V within 1 second, the capacitance value of the direct-current busbar is 1000 μF, and the calculation formula of resistance value and heat dissipation is as follows:

$$60 = 500 e^{-\frac{t}{RC}}$$

It is obtained by calculation that R=471.6Ω. That is, R<471.6Ω can guarantee that the discharging duration is controlled to be within 1 second. According to a series standard of resistor, two resistors of 200Ω are employed, and the maximum discharging power of the resistors is:

$$P_{max} = \frac{500 \times 500}{200 + 200} = 625 \text{ W}$$

It can be known that the maximum power that each of the resistors is required to consume is 312.5 W or the equivalent energy.

Figure 2:
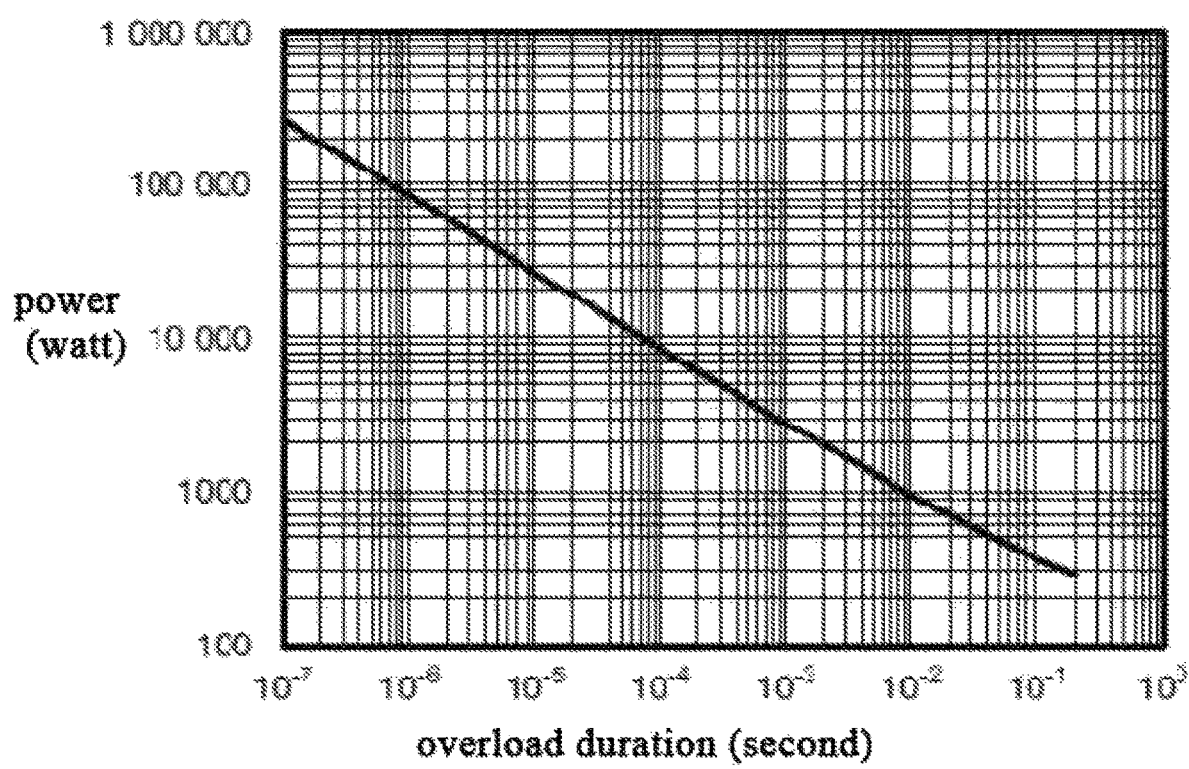
FIG. 2 is a curve diagram of the relation between the maximum power and the overload duration of a discharging resistor according to an embodiment of the present disclosure.

Referring to FIG. 2, it can be known from FIG. 2 that the overload duration for a resistor of a power of 312.5 W is approximately 100 ms. For sake of safely, if the electric-motor controller detects within 50 ms that the direct-current busbar voltage has not decreased within a certain range, it actively discharges to shut off the MOS transistor. Accordingly, the requirements on the LTO100 peak power can be satisfied.

At this point, the practical discharging duration is:

$$60 = 500 e^{-\frac{t}{400 ohm \times 1000 uF}}$$
$$t = 0.85 \text{ s}$$

The calculation of the rated power will be described below. It is assumed that the housing temperature of the electric-motor controller is 85° C. (when the temperature of the cooling water is 85° C., there is no safety margin), the junction temperature of the LTO100 is 175° C., the thermal resistance is $R_{th(J-C)}$=1.5(C/W), the LTO100 is coated with a thermally conductive silicone grease and then mounted on the housing, and the thermal resistance of the thermally conductive silicone grease is $R_{th(C-H)}$=1(C/W), then the rated power that the LTO100 is able to withstand is:

$$P_{th} = \frac{\Delta T}{R_{th(J-C)} + R_{th(C-H)}} = \frac{175 - 85}{1.5 + 1} = 36 \text{ W}$$

The energy of the 1000 μF direct-current busbar capacitor when it is discharged from 500V to 60V is $$E = \tfrac{1}{2} C(U_1^2 - U_2^2) = \tfrac{1}{2} \times 1000 \text{ uF} \times (500^2 - 60^2) = 123.2 J$$

The practical rated power is:

$$P_{rate} = \frac{E}{t} = -\frac{123.2}{0.85} = 145 \text{ W}$$

It can be seen that each of the resistors is required to consume a rated power of 72.5 W, which does not satisfy the tolerable range of at most 36 W. Therefore, that is required to be changed to a solution of four series-connected resistors, wherein each of the resistors consumes 36.25 W, which is still greater than 36 W, so the discharging duration is required to be prolonged to 0.85-1 second. Accordingly, it can be known that, according to a series standard of resistor of 1%, four resistors of 110Ω are employed, and then the practical discharging power is:

$$P_{max} = \frac{500 \times 500}{4 \times 110} = 568.2 \text{ W}$$

The peak power that each of the resistors consumes is 142 W, which satisfies the requirement. Therefore, it may be detected after 1 discharging cycle whether the direct-current busbar voltage has decreased to 60V or greatly decreased, and if not, the MOS transistor is turned off. At this point, the rated power is:

$$P_{rate} = \frac{E}{t} = \frac{123.2}{0.93} = -132.5 \text{ W}$$

The rated power that each of the resistors consumes is 33 W, which is less than 36 W.

Therefore, it can be determined to use four resistors of 110Ω connected in series, as the discharging resistors. The corresponding maximum discharging current is:

$$I_{max} = \frac{500}{4 \times 110} = 1.1 A$$

Accordingly, it can be known that, the present embodiment, by using the four resistors connected in series, realizes quickly discharging within a short duration, and guarantees the safety of the electric-motor controller.

In conclusion, the discharge controlling circuit of the electric-motor controller of the present embodiment prevents the risk of high-voltage leakage, and obtains the advantageous effect that once emergency happens, the capacitors can be discharged within a short duration. Furthermore, the circuit has a simple structure and a low cost, and can be conveniently promoted and applied on a large scale.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

What is claimed is:

1. A discharge controlling circuit of an electric-motor controller, wherein the discharge controlling circuit comprises: a discharging-signal transmitting circuit, a switch circuit and a discharging circuit, wherein:
   the switch circuit is connected respectively to the discharging-signal transmitting circuit and the discharging circuit;
   the discharging circuit is connected to an anode of a busbar;
   an input end of the discharging-signal transmitting circuit is connected to a discharging-signal outputting pin of the electric-motor controller, and an output end of the discharging-signal transmitting circuit is connected to a cathode of the busbar;
   the discharging-signal transmitting circuit is configured to output a controlling signal to the switch circuit according to a received discharging signal;
   the switch circuit is connected to the anode of the busbar, the cathode of the busbar and the output end of the discharging-signal transmitting circuit, and is configured to be turned on according to the received controlling signal and discharge via the discharging circuit; and
   the discharging circuit comprises a plurality of discharging resistors in series, and a quantity of the discharging resistors and resistance values of the discharging resistors are designed according to discharge time and powers of the discharging resistors,
   wherein the discharging-signal transmitting circuit comprises: an optical coupler and a filter circuit, wherein:
   the filter circuit comprises a first filter capacitor, a filter resistor and a second filter capacitor;
   an input anode pin of the optical coupler is connected to the discharging-signal outputting pin, and the discharging-signal outputting pin is connected to the electric-motor controller;
   an input cathode pin of the optical coupler is grounded;
   a signal outputting cathode of the optical coupler is connected to one end of the first filter capacitor and connected to the cathode of the busbar;
   a signal outputting anode of the optical coupler is connected to the other end of the first filter capacitor and one end of the filter resistor, and the other end of the filter resistor is connected to one end of the second filter capacitor and a controlling end of the switch circuit; and
   the other end of the second filter capacitor is connected to the cathode of the busbar,
   wherein:
   the switch circuit comprises: a triode, an MOS transistor, and a first divider resistor, a second divider resistor, a third divider resistor, a fourth divider resistor, a fifth divider resistor, a sixth divider resistor, a seventh divider resistor, an eighth divider resistor, a ninth divider resistor, a tenth divider resistor and an eleventh divider resistor that are sequentially connected in series;
   a base of the triode is connected to the signal outputting anode of the optical coupler;
   an emitter of the triode is connected to one end of the tenth divider resistor, one end of the eleventh divider resistor and a grid of the MOS transistor;
   a collector of the triode is firstly connected to the other end of the eleventh divider resistor and then connected to the cathode of the busbar; and
   a source of the MOS transistor is connected to the cathode of the busbar, and a drain of the MOS transistor is connected to the discharging circuit,
   wherein:
   the switch circuit further comprises: a third capacitor and a diode;
   one end of the third capacitor is connected to one end of the eleventh divider resistor and the emitter of the triode;
   the other end of the third capacitor is connected to the other end of the eleventh divider resistor and the collector of the triode;
   a cathode of the diode is connected to one end of the eleventh divider resistor and the grid of the MOS transistor; and
   an anode of the diode is firstly connected to the other end of the eleventh divider resistor and the source of the MOS transistor and then connected to the cathode of the busbar, and
   wherein:
   the discharging circuit comprises: a first discharging resistor, a second discharging resistor, a third discharging resistor and a fourth discharging resistor that are connected in series;
   one end of the third discharging resistor is connected to the drain of the MOS transistor; and
   the other end of the third discharging resistor is connected to the anode of the busbar.

2. The discharge controlling circuit of an electric-motor controller according to claim 1, wherein the resistance value of each of the first discharging resistor, the second discharging resistor, the third discharging resistor and the fourth discharging resistor is 110Ω.

3. The discharge controlling circuit of an electric-motor controller according to claim 1, wherein a model of the optical coupler is: ACPL-K30T-000E.

* * * * *